United States Patent [19]
Matsuki et al.

[11] Patent Number: 5,730,237
[45] Date of Patent: Mar. 24, 1998

[54] BATTERY TEMPERATURE-RAISING DEVICE FOR ELECTRIC VEHICLE

[75] Inventors: Tsutomu Matsuki; Takayoshi Matsuno, both of Aichi-ken, Japan

[73] Assignee: Toyota Jidosha Kabushiki Kaisha, Japan

[21] Appl. No.: 698,977

[22] Filed: Aug. 16, 1996

Related U.S. Application Data

[62] Division of Ser. No. 163,723, Dec. 9, 1993, Pat. No. 5,624,003.

[30] Foreign Application Priority Data

Dec. 10, 1992 [JP] Japan ..................... 4-330664
Jun. 30, 1993 [JP] Japan ..................... 5-162525

[51] Int. Cl.⁶ ........................................ B60L 11/00
[52] U.S. Cl. ........................... 180/65.1; 180/68.5
[58] Field of Search ................. 180/65.1, 68.5, 180/68.2, 68.3; 320/2; 429/62, 120

[56] References Cited

U.S. PATENT DOCUMENTS 5,031,712  7/1991  Karolek et al. ............... 180/68.5
5,291,960  3/1994  Brandenburg et al. .......... 180/65.2
5,490,572  2/1996  Tajiri et al. ................. 180/68.5

FOREIGN PATENT DOCUMENTS 58-54903    4/1983   Japan.
60-192367  12/1985   Japan.
61-47078    3/1986   Japan.
4-248334    9/1992   Japan.

*Primary Examiner*—Richard M. Camby
*Attorney, Agent, or Firm*—Finnegan, Henderson, Farabow, Garrett & Dunner, L.L.P.

[57] ABSTRACT

The present invention relates to a battery heating device for an electric vehicle, which includes: a combustion heater for heating an interior of the electric vehicle; batteries which are a driving source of the electric vehicle, the batteries being disposed about the combustion heater; and a transfer device for transferring exhaust heat from the combustion heater, which is in operation, to the batteries. When the combustion heater is actuated, the battery temperature is raised by the exhaust heat from the combustion heater.

11 Claims, 8 Drawing Sheets

5,730,237

1

BATTERY TEMPERATURE-RAISING DEVICE FOR ELECTRIC VEHICLE

This is a division of application Ser. No. 08/163,723 filed Dec. 9, 1993 now U.S. Pat. No. 5,624,003.

BACKGROUND OF THE INVENTION

1. Field of the Invention

The present invention relates to a battery heating device for an electric vehicle, which is designed for use in an electric vehicle having a heat-generating source such as a combustion heater.

2. Description of the Related Art

In an electric vehicle without a heat source such as an engine, the utilization of a combustion heater in order to heat the interior of the vehicle is known. (Refer to Japanese Utility Model Application Laid-Open No. 58-54903.) A brief description will now be provided hereinafter in connection with a structure disclosed in the above publication.

FIG. 7 illustrates this particular structure in which an unit case 102 is disposed within a vehicle interior 100. The unit case 102 houses a blower 104. An air inlet portion 106 and an air blowing portion 108 are located respectively upstream and downstream from the blower 104.

The unit case 102 is further provided with: a chest-oriented blowing port 110; a defroster port 112; a leg-oriented blowing port 114; and, dampers for opening and closing these ports.

Meanwhile, a combustion heater 120 as well as a motor 118 are disposed within a motor room 116 which is located outside of the vehicle interior.

The above-noted unit case 102 and combustion heater 120 communicate with each other via a duct 122 so as to bring air from the unit case 102 into the heater 120. The combustion heater 120 is provided with a heated air blow-off port 124 on a side portion thereof. The heated air blowing port 124 communicates with one end of a heater duct 125. The other end of the heater duct 125 communicates with the interior of the unit case 102 at a location between the blower 104 and the air blowing portion 108. The combustion heater 120 has an exhaust pipe 126 mounted thereto so as to permit exhaust gases, which are produced by the heater 120, to be discharged outside of the vehicle.

According to the above construction, the combustion heater 120 is disposed within the motor room 116 that is located outside of the vehicle interior. Further, the combustion heater 120 and the unit case 102, which is located within the vehicle interior, communicate with each other via the heated air blowing port 124 and heater duct 125 in such a manner as to permit heated air, which is subjected to heat by the heater 120, to be introduced into the unit case 102. This arrangement eliminates the need for considerable improvements in the unit case 102 to be made in order to combine the combustion heater 120 with the unit case 102. Further, a stench caused by the combustion of fuel such as kerosene can be prevented from lingering in the vehicle interior 100.

However, the construction disclosed in the above-noted publication is designed for the exclusive use of the combustion heater 120 for heating the vehicle interior 100. As a result, exhaust heat, which is unused for heating, is discarded as an exhaust gas in the air from the exhaust pipe 126 without being utilized. Thus, there is a problem in that the above structure makes no effective use of the exhaust heat from the combustion heater 120.

Further, by way of another example in the related art, the following construction will be described.

2

It is commonly known that a battery disposed in a vehicle will exhibit a reduced level of charging-discharging efficiency in low temperature environments. As a method of preventing a drop in efficiency, there is disclosed a structure for raising and maintaining the temperature of a battery. (For one example of the above, reference is made to Japanese Utility Model Application Laid-Open No. 60-192367.)

A brief description will now be provided in connection with the structure disclosed in the above publication.

FIG. 8 illustrates the above-identified structure in which a plate-shaped container 200 is provided for accommodating a battery 202. The container 200 is formed of a heat-insulating material. The container 200 has a planarshaped heater 204 removably attached to the base thereof, and as such, the battery 202 is received therein. The heater 204 has electrodes 206 and 208 mounted on both sides thereof (that is, the electrodes 206 and 208 are located on the inside of opposite side walls of the container 200). One of the electrodes, 206, is connected to a plug 212 via a fuse 210, while the other 208 is coupled to the same plug 212 via a thermostat 214.

According to the above structure, for charging of the battery 202 in low temperature environments, the plug 212 is inserted into an outlet and electricity is supplied to the electrodes 206 and 208 so as to heat the planer-shaped heater 204. As a result, heat is applied to the battery 202 which is sealingly placed on the heater 204, thereby improving charging efficiency.

However, the disclosed structure in the publication using the planar-shaped heater 204 presents the following disadvantage when used to elevate and maintain the temperature of a large-sized battery disposed in an electric vehicle.

That is, when the battery is charged a substantial increase in the consumption of electric power is required from an external power supply. This goes against the demand for saving electric power. In addition, the planar-shaped heater 204 is heated during traveling because the large-sized battery is used as a power source. Such heating results in a considerable increase in the amount of electric power required from a vehicle power supply (i.e., the battery), with a concomitant decrease in mileage of the electric vehicle per charging.

SUMMARY OF THE INVENTION

In view of the above fact, an object of the present invention is to provide a battery heating device for an electric vehicle, which is capable of making effective use of exhaust heat from a combustion heater.

Another object off the present invention is to provide a battery heating device for an electric vehicle, which can elevate and maintain a battery temperature so as to reduce consumption of electric power during at least one of charging and traveling.

First aspect off the present invention provides a battery heating device for an electric vehicle, which comprises: a combustion heater for heating the interior of the electric vehicle; batteries serving as a driving source of the electric vehicle, the batteries being disposed about the combustion heater; and, transfer means for transferring exhaust heat from the combustion heater, which is in operation, to the batteries.

A second aspect of the present invention provides a battery heating device for an electric vehicle, which comprises: batteries acting as a driving source of the electric vehicle; charging means for charging the batteries by being connected to an external power supply; a conduit formed body forming a circulating path, said conduit formed body being located in one of close proximity to and in contact with the batteries midway along the circulating path; and, transfer means, positioned midway along the circulating path of the conduit formed body, for transferring exhaust heat from the charging means during charging to a heat-transfer medium which flows within the conduit formed body.

A third aspect of the present invention provides a battery heating device for an electric vehicle, which comprises: batteries serving as a driving source of the electric vehicle; electric power-converting means electrically connected to tile batteries; a traveling motor electrically connected to the electric power-converting means and rotated to run the electric vehicle in response to electric power supply from the batteries through the electric power-converting means; a conduit formed body forming a circulating path, said conduit formed body being located in one of close proximity to and in contact with the batteries midway along the circulating path; and, transfer means, positioned midway along the circulating path of the conduit formed body, for transferring exhaust heat from at least one of the traveling motor and the electric power-converting means during traveling to be transferred to a heat-transfer medium which flows within the conduit formed body.

A fourth aspect of the present invention provides a battery heating device for an electric vehicle, which comprises: batteries serving as a driving source of the electric vehicle; a charging means for charging the batteries by being connected to an external power supply; an electric power-converting means electrically connected to the batteries; a traveling motor electrically connected to the electric power-converting means and rotated to run the electric vehicle in response to an electric power supply from the batteries through the electric power-converting means; a conduit formed body forming a circulating path, said conduit formed body being located in one off close proximity to and in contact with the batteries midway along the circulating path; first transfer means, positioned midway along the circulating path of the conduit formed body, for transferring exhaust heat from the charging means during charging to a heat-transfer medium which flows within the conduit formed body; and, second transfer means, positioned midway along the circulating path of the conduit formed body, for transferring exhaust heat from at least one of the traveling motor and the electric power-converting means during traveling to the heat-transfer medium which flows in the conduit formed body.

A fifth aspect of the present invention provides a battery heating device for an electric vehicle in accordance with any one of the second aspect through the fourth aspect of the present invention, the battery heating device further comprising: a branch path-forming body located midway along the circulating path of the conduit formed body, said branch path-forming body forming a branch path that is subdivided from the circulating path; cooling means, positioned midway along the branch path of the branch path-forming body, for cooling the heat-transfer medium which flows within the branch path-forming body; and, temperature control means for controlling a temperature off the heat-transfer medium by regulating an amount of the heat-transfer medium to be fed to the cooling means, so as to maintain the batteries at a predetermined temperature.

A sixth aspect of the present invention provides a battery heating device for an electric vehicle in accordance with the first aspect of the present invention, the battery heating device further comprising: a conduit formed body forming a cooling purpose-circulating path, the transfer means being located midway along the cooling purpose-circulating path; cooling means positioned midway along the cooling purpose-circulating path for coooing a heat-transfer medium which flows in the conduit formed body; and, temperature control means for controlling a temperature of the heat-transfer medium by regulating an amount of the heat-transfer medium to be fed to the cooling means, so as to maintain the batteries at a predetermined temperature.

It is generally known that an electrolyte solution in a battery of an electric vehicle will undergo attenuated chemical reaction in low temperature environments such as in cold regions, with a concomitant reduction in the performance of the battery. However, such degradation of the battery is likely to occur in any low temperature environments such as in winter in regions other than those which are cold.

According to the first aspect of the present invention, when the combustion heater is actuated during traveling in order to heat the interior of vehicle, the transfer means transfers exhaust heat from the combustion heater (i.e., residual heat that has been unused for heating) to the batteries. This feature raises a battery temperature without consuming electric power which is stored in the batteries. As a result, the batteries exhibit improved discharging capability without detracting from battery performance.

According to the second aspect, for charging of the batteries, the charging means is connected to an external power supply. The batteries are thereby charged through the charging means. In this process, heat radiating from the charging means results in exhaust heat. The exhaust heat is transferred by the transfer means to the heat-transfer medium which flows in the conduit formed body. The heat-transfer medium is thereby heated. The heated medium is fed to the batteries through the conduit formed body, with a consequential rise in battery temperature. As a result, the batteries exhibit improved chargeability.

It is now found from the above-described battery-charging process that electric power from the external power supply is consumed merely for the purpose off circulating the heat-transfer medium in the conduit formed body. This consumption of electric power is nominal, as compared with power consumption required for conventional use of a planar-shaped heater for heating a large-sized battery. Thus, the consumption of electric power required for the external power supply during battery charging is substantially reduced. Furthermore, there is no need to provide any additional new construction for elevating battery temperature.

According to the third aspect, the electric power-converting means converts electric power stored in the batteries into a specified current in order to permit the traveling motor to be rotated by the converted current. The electric vehicle is thereby maintained in a running state.

During traveling, heat radiates from the traveling motor, and from the electric power-converting means. The heat radiated by those components results in exhaust heat. Among the exhaust heat, either exhaust heat from the traveling motor or that from the electric power-converting means, or otherwise both of the former and the latter are transferred by the transfer means to the heat-transfer medium which blows within the conduit formed body. The heat-transfer medium is thereby heated. The heated medium is fed to the batteries through the conduit formed body. As a result, there is a rise in battery temperature. The batteries thereby display improved dischargeability.

As can be seen from the above, during traveling, electric power from the batteries is consumed exclusively for the purpose of circulating the heat-transfer medium in the conduit formed body. This consumption of electric power is nominal, when compared with power consumption required for conventional use of a planar-shaped heater for heating a large-sized battery. Thus, the consumption of electric power required for the batteries during traveling is substantially reduced. As a result, mileage of the electric vehicle per charging can be increased. Furthermore, there is no need to provide any new additional construction for raising battery temperature.

According to the fourth aspect, for charging the batteries, the charging means is first connected to the external power supply. The batteries are thereby charged. In this process, heat radiating from the charging means results in exhaust heat. The exhaust heat is transferred by the first transfer means to the heat-transfer medium which flows in the conduit formed body. The heat-transfer medium is thereby heated. The heated medium is fed to the batteries through the conduit formed body. As a result, there is a rise in battery temperature. Accordingly, the batteries exhibit improved chargeability.

In the above-described battery-charging process, electric power from the external power supply is consumed merely for the purpose of circulating the heat-transfer medium in the conduit formed body. This consumption electric power is nominal, as compared with electric power consumption required for the conventional use of a planar-shaped heater for heating a large-sized battery. Thus, the electric power consumption required for the external power supply during battery charging is substantially reduced. Moreover, there is no need to provide any new additional construction for raising battery temperature.

Meanwhile, the electric power-converting means converts electric power stored in the batteries into a specified current in order to permit the traveling motor to be rotated by the converted current. The electric vehicle is thereby maintained in a running state.

During traveling, heat radiates from the traveling motor, and from the electric power-converting means. The heat released by those components results in exhaust heat. Among the exhaust heat, either exhaust heat from the traveling motor or that from the electric power-converting means, or otherwise both the former and the latter are transferred by the second transfer means to the heat-transfer medium which flows in the conduit formed body. The heat-transfer medium is thereby heated. The heated medium is fed to the batteries through the conduit formed body. As a result, there is a rise in battery temperature. Accordingly, the batteries exhibit improved dischargeability.

As can be seen from the above, during traveling, electric power from the batteries is consumed merely for the purpose of circulating the heat-transfer medium in the conduit formed body. This consumption of electric power is nominal, as compared with electric power consumption required for the conventional use of a planar-shaped heater for heating a large-sized battery. Accordingly, the consumption of electric power required for the batteries during traveling is substantially reduced. As a result, mileage of the electric vehicle per charging can be increased. Furthermore, there is no need to provide any new additional construction for elevating battery temperature.

In brief, the present invention provides improved battery performance of charging-discharging during both charging and traveling despite a substantial reduction in electric power consumption.

The fifth aspect of the present invention is based on any one of the second aspect through the fourth aspect of the present invention, and further comprises the branch path-forming body which has the branch path defined midway along the circulating path. In addition, the cooling means is disposed midway along the branch path. Accordingly, when the heat-transfer medium is fed to the cooling means, heat retained by the heat-transfer medium is dissipated in accordance with an amount of the heat-transfer medium to be fed thereto. Further, in the present invention, the temperature control means regulates the amount of the heat-transfer medium to be fed to the cooling means, thereby maintaining the batteries at a predetermined temperature. As a result, the performance of the batteries can successfully sustained even when the environmental temperature is high such as in summer.

The sixth aspect of the present invention is based on the first aspect of the present invention, and further comprises the transfer means and the cooling means, both of which are positioned midway along the cooling purpose-circulating path. Accordingly, when battery temperature needs to be lowered, the cooling means can cool the heat-transfer medium which flows within the conduit formed body that is defined by the cooling purpose-circulating path. In this case, when the cooled medium is fed to the transfer means, the transfer means is first cooled. Next, the cooled transfer means lowers the battery temperature. Moreover, in the present invention, the temperature control means regulates an amount of the heat-transfer medium to be fed to the cooling means, thereby maintaining the batteries at a predetermined temperature.

The cooling means and the temperature control means can be actuated under both operative and non-operative conditions of the combustion heater. In the former case, the transfer means is restrained from performing function (i.e., the function of transferring the exhaust heat from the combustion heater to the batteries). Meanwhile, in the latter case, the transfer means is utilized to cool the batteries when not being required to exercise the function. (That is, in the latter case, the transfer means is used for a different purpose.)

DESCRIPTION OF THE PREFERRED EMBODIMENTS

A battery heating device 10 according to an embodiment of the present invention will be described hereinafter with reference to FIG. 1 through FIG. 4. Note that arrows "FR", "UP", and "IN" in these drawings respectively represent the forward direction, the upper direction, and the interior direction, of a vehicle.

Figure 4:
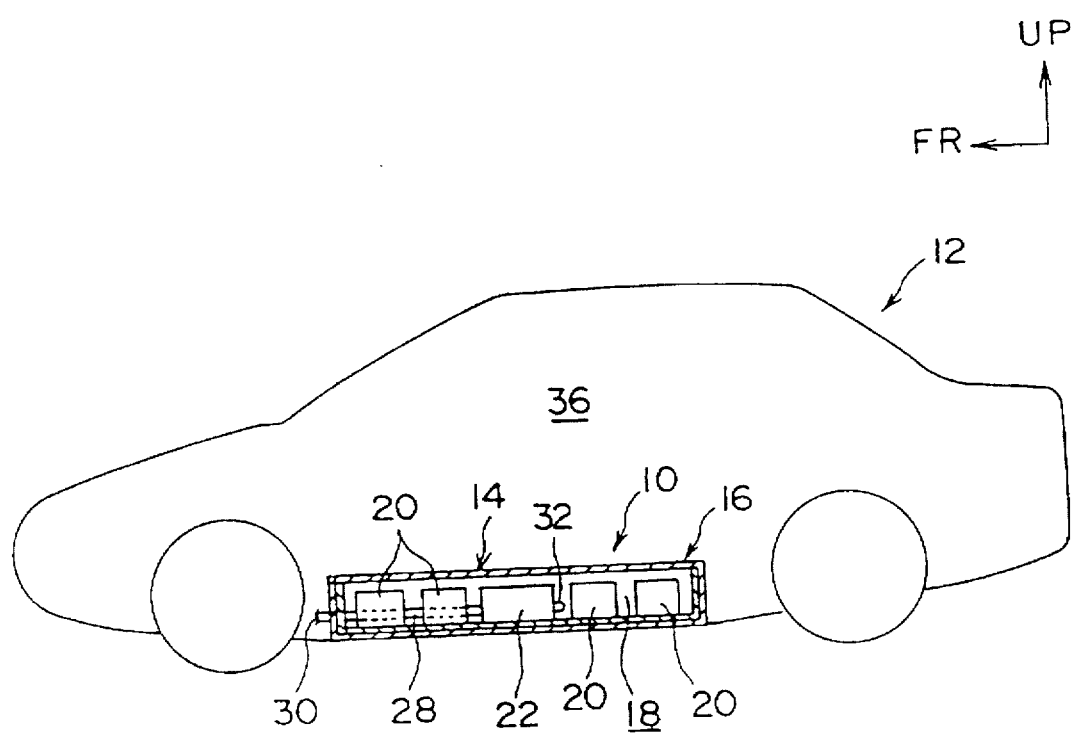
FIG. 4 is a schematic configuration view, depicting an electric vehicle in which the battery heating device of FIG. 1 is disposed.

Referring now to FIG. 4, the battery heating device 10 according to the present embodiment is shown positioned at a central portion off an electric vehicle 12 beneath a floor panel thereof. The electric vehicle is designed for use in cold regions.

Figure 1:
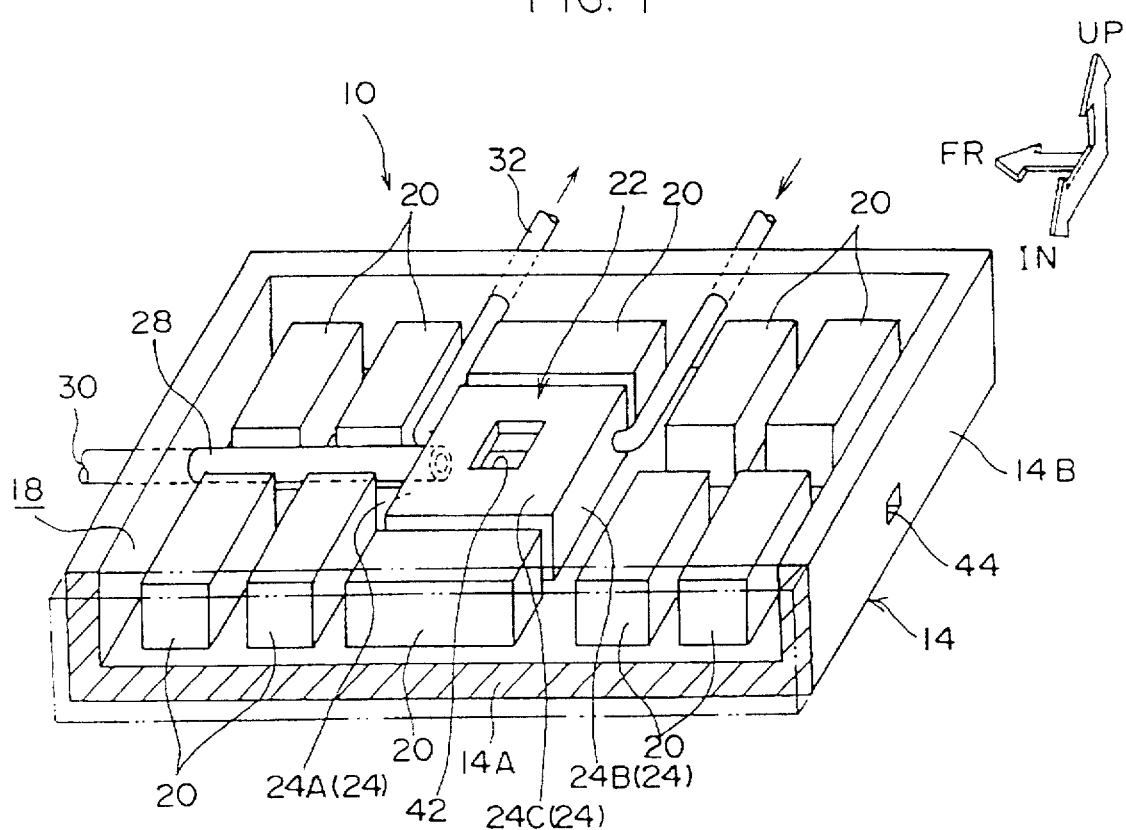
FIG. 1 is a perspective view, showing a battery heating device, with a heat-insulating material being removed therefrom, in accordance with an embodiment of the present invention.
Figure 2:
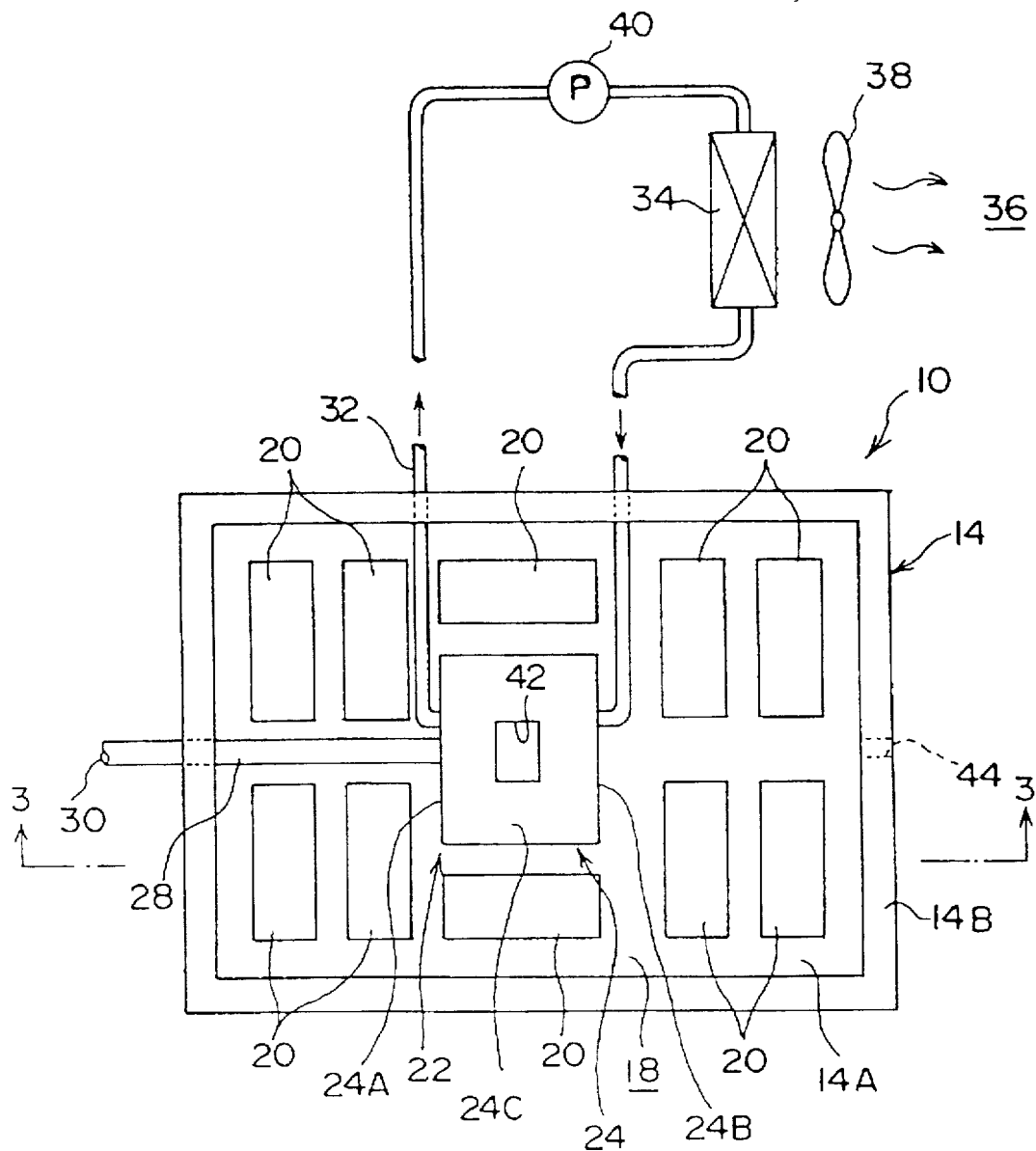
FIG. 2 is a plan view, showing the battery heating device of FIG. 1.
Figure 3:
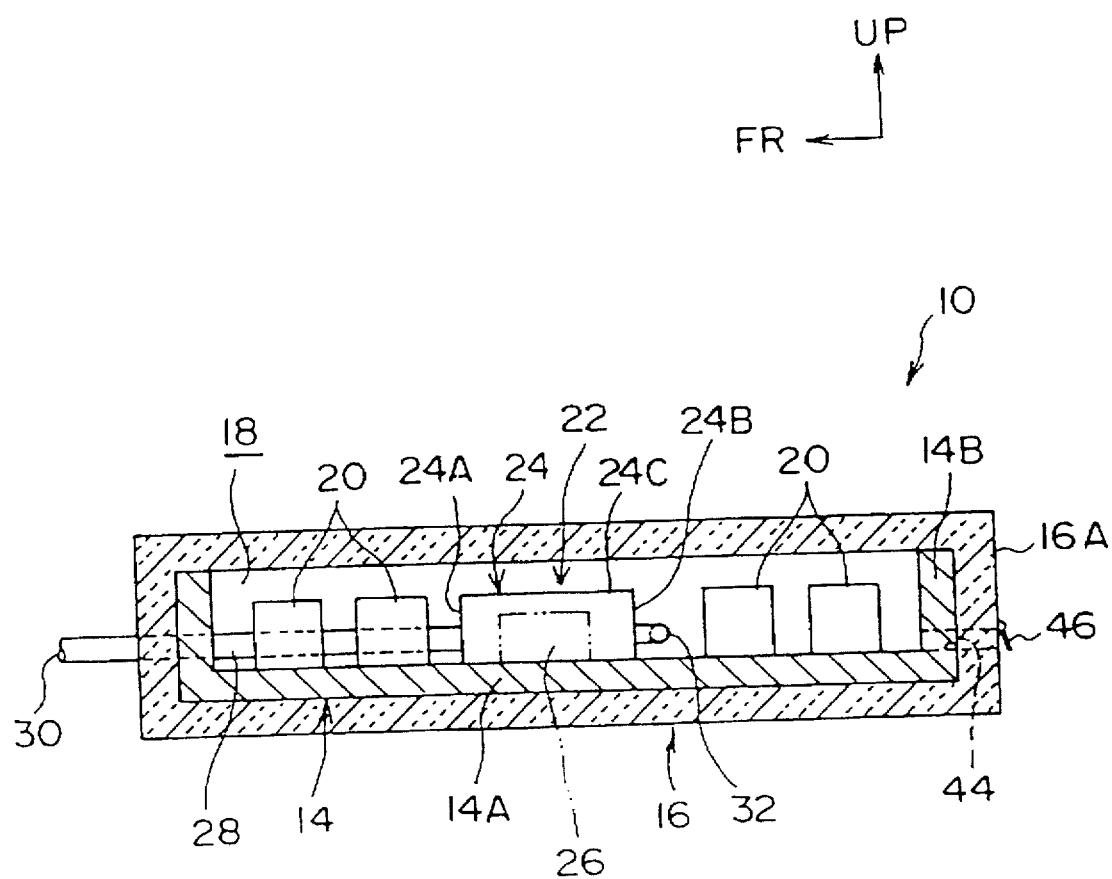
FIG. 3 is a cross-sectional view taken along line 3—3 of FIG. 2, illustrating a cutaway state of the battery heating device, with the heat-insulating material thereon.

As illustrated in FIG. 1 through FIG. 3 the battery heating device 10 includes a battery tray 14 formed of metal. The battery tray 14 has a box-like shape, with the top open. The battery tray 14 is covered with a heat-insulating material 16 around the periphery thereof. (See FIG. 3.) The battery tray 14 is thereby defined with a chamber 18 which is surrounded by the inner peripheral surfaces of the battery tray 14 and a reverse side of an upper portion of the heat-insulating material 16. The battery tray 14, the heat-insulating material 16, and the chamber 18 correspond to a transfer means in the present invention.

The above-described chamber 18 accommodates a plurality of batteries 20. The batteries 20 are each rectangular in shape, and are positioned on a bottom wall portion 14A of the battery tray 14. Unillustrated positioning members, having convex curved shapes, are provided integrally between the closely spaced batteries 20 which lie on an upper surface of the bottom wall portion 14A. The positioning members, prevent the batteries 20 from assuming out-of-line positions. However, there are no limitations as to how the batteries 20 may be positioned. The bottom wall portion 14A could have positioning protrusions provided in an upright position, or the batteries 20 themselves could be anchored to the bottom wall portion 14A by means off screws and the like.

The battery tray 14 is further accommodated with a combustion heater section 22 located at a substantially central area thereof. The combustion heater section 22 is comprised of a box-shaped casing 24 which accommodates a combustion heater 26 (shown by a two-dot chain line in FIG. 3). The combustion heater 26 may be designed for combustion in either a dripping evaporation mode or a rotary atomization mode.

An air intake duct 28 is connected at one end to a front-side wall portion 24A of the casing 24 so as to communicate with an interior space of the casing 24. The other end of the air intake duct 28 is an air intake poet 30. As a result, air admitted from the air intake poet 30 is introduced into the interior space of the casing 24 in the combustion heater section 22 through the air intake duct 28.

A U-shaped portion of a refrigerant pipe 32 is provided through the front-side wall portion 24A and a rear-side wall portion 24B of the casing 24. The refrigerant pipe 32 communicates with an interior heat exchanger 34. (See FIG. 2.) A blower 38 is positioned downstream from the interior heat exchanger 34 so as to permit hot air, which is subjected to heat exchange by the interior heat exchanger 34, to be blown into a vehicle interior space 36. Further, a water pump 40 is positioned midway along the refrigerant pipe 32 so as to be actuated to feed a refrigerant in a given direction (i.e., directions of arrows in FIG. 1 and FIG. 2). As a result, when the combustion heater 26 is ignited to initiate combustion, the refrigerant is heated by the burned gases while passing through the U-shaped portion of the refrigerant pipe 32. The hot refrigerant, which has been heated in the combustion heater section 22, exerts exothermic action on the interior heat exchanger 34. Thereafter, the hot refrigerant cools, and is returned to the combustion heater section 22. A heat-pumping type air-conditioning system may be used as a heating system. Alternatively, the heating system according to the present embodiment may be used with the heat-pumping type air-conditioning system.

Added to this, FIG. 2 is a schematic configuration view for illustrating a relationship between the battery heating device 10 and the heating system. FIG. 2 does not include any symbols indicative of directions such as arrow "FR" and the like because a midway portion of the refrigerant pipe 32 is omitted.

The previously mentioned casing 24 has a rectangular-shaped exhaust hole 42 defined in a substantially central portion off a top wall portion 24C thereof. Accordingly, exhaust gases generated by the combustion heater 26 (i.e., gases which reside after the refrigerant experiences heat exchange) are drawn into chamber 18 through the exhaust hole 42. Consequently, the interior of the chamber 18 becomes filled with the exhaust gases.

Further, the battery tray 14 and the heat-insulating material 16 have a common exhaust hole 44 defined at respective intermediate portions of rear-side wall portions 14B and 16B thereof in relation to a vertical direction thereof. The exhaust hole 44 extends through the rear-side wall portions 14B and 16B. In addition, the heat-insulating material 16 is provided with an open-close valve 46 on an outer surface of the rear-side wall portion 16A in order to open and close the exhaust hole 44. The open-close valve 46 includes a helical tension spring (not shown) which has a given spring constant. The helical tension spring urges the open-close valve 46 in a direction in which the exhaust hole 44 is closed. Accordingly, the open-close valve 46 usually remains biased to close the exhaust hole 44. However, the open-close valve 46 is released against the urging force of the helical tension spring when the exhaust gases resulting from ignition of the combustion heater 26 causes an internal pressure off the chamber 18 to exceed its predetermined value.

Next, the operation of the present embodiment will be described hereinafter.

For heating a vehicle interior space 36, a water pump 40 and a blower 38 are initially operated. Next, a combustion heater 26 is ignited. The ignition of the heater 26 produces combustion gases which heat a refrigerant. The heated refrigerant flows into an interior heat exchanger 34 through a refrigerant pipe 92 in order to yield exothermic action. Air that surrounds the interior heat exchanger 34 is thereby heated. The heated air is blown into the vehicle interior space 36 by the blower 38.

Meanwhile, exhaust gases, generated by the combustion heater 26, are discharged through an exhaust hole 42 into a chamber 18 that is enclosed by a battery tray 14 and a heat-insulating material 16. The interior of the chamber 18 is filled with the discharged gases which provide natural convection caused by pressures of the gases.

At this stage, the exhaust gases which filled the chamber 18 still retain a sufficient amount of heat. Accordingly, exhaust heat is transferred from the exhaust gases to a plurality of batteries 20 which are placed on the battery tray 14. The batteries 20 are thereby heated. As a result, there is no drop in temperatures of electrolyte solutions in the batteries 20 occurs, even in cold regions. Therefore, the electrolyte solutions undergo normal chemical reactions.

Since the battery tray 14 is covered with the heat-insulating material 16, temperatures off the batteries 20 are first raised and then maintained.

When the internal pressure of the above-described chamber 18 exceeds a predetermined value as a result of the exhaust gases discharged from the heater 26 into the chamber 18, the pressure of the exhaust gases pushes and dislodge the open-close valve 46 away from the exhaust hole 44 against the urging force of the helical tension spring. The exhaust gases are discharged into the exterior of the vehicle after the exhaust heat is transferred to the batteries 20.

As can be seen from the above, in an electric vehicle having a heating system which employs the combustion heater 26 in accordance with the present invention, the plurality of batteries 20 are positioned around the combustion heater 26 so as to transfer the exhaust heat, which is unused for heating, to the batteries 20 via the chamber 18 that is defined by the battery tray 14 and the heat-insulating material 16. This arrangement allows the exhaust heat from the combustion heater 26 to be used to raise the temperature of the batteries 20. As a result, deterioration of the performance of the batteries 20 can be prevented. Consequently, an increase in mileage for each charging of the batteries 20 can even be attained in cold regions. In brief, the present embodiment can make effective use of the exhaust heat from the combustion heater 26.

Furthermore, according to the present embodiment, the battery tray 14 and the heat-insulating material 16 wrapped thereabout define the chamber 18 in which the combustion heater section 22 is positioned at a central portion thereof. This feature permits the exhaust heat to be transferred to the batteries 20 as a result of natural convection of the exhaust gases induced by the exhaust pressure of the gases. As a consequence, a saving in electric power is achievable, as compared with a construction in which, for example, an additional fan is provided for transferring the exhaust heat from the combustion heat 26 to the batteries 20.

In the present embodiment, the plurality of batteries 20 are set tightly on the upper surface of the bottom wall portion 14A of the battery tray 14. However, the present invention is not limited to the same. Alternatively, the batteries 20 may be removably supported by a pin in such a manner as to be spaced slightly apart from the upper surface of the bottom wall portion 14A. This arrangement provides improved heat-transfer efficiency because the exhaust gases accompanying natural convection are caused to flow across the undersides of the batteries 20.

Moreover, the present embodiment may include the following construction: the battery tray 14 and a radiator acting as a cooling means are connected together via a feed pipe, which functions as a conduit path-forming body, so as to form a cooling purpose-circulating path. In addition, a water pump is positioned midway along the feed pipe. In this case, part of the feed pipe is embedded in the bottom wall portion 14A of the battery tray 14. Further, since water serves as a heat-transfer medium, the water pump is designed in such a manner that an amount of water to be fed to the batteries 20 per unit time is alterable depending upon the temperatures of the batteries 20. To be specific, a temperature-detecting sensor and a control device may be provided together. The temperature-detecting sensor detects the temperature of the water which flows in the feed pipe. The control device functions as a temperature control means for controlling an output of the water pump in accordance with detected values from the temperature-detecting sensor. Needless to say, the amount of the fed water may be regulated by other methods as well.

According to the above-described structure, the control device calculates an optimum output off the water pump when a detected value from the temperature-detecting sensor (that is, the temperature off the batteries 20) exceeds a predetermined temperature of the batteries 20. The predetermined temperature has previously been stored in the control device. The water pump is actuated in response to the calculation results. The water is thereby circulated along the feed pipe between the battery tray 14 and the radiator. In this process, the water is cooled by the radiator. While flowing through the inside of the bottom wall portion 14A of the battery tray 14, the cooled water first cools the bottom wall portion 14A, and then the batteries 20 which are placed thereon. When the temperatures of the batteries 20 reaches the predetermined temperature, the water pump in operation is switched off. Thereafter the batteries 20 are maintained at the predetermined temperature by the heat-insulating material 16.

Next, a battery heating device 50 according to another embodiment of the present invention will be described with reference to FIG. 5 and FIG. 6.

Figure 5:
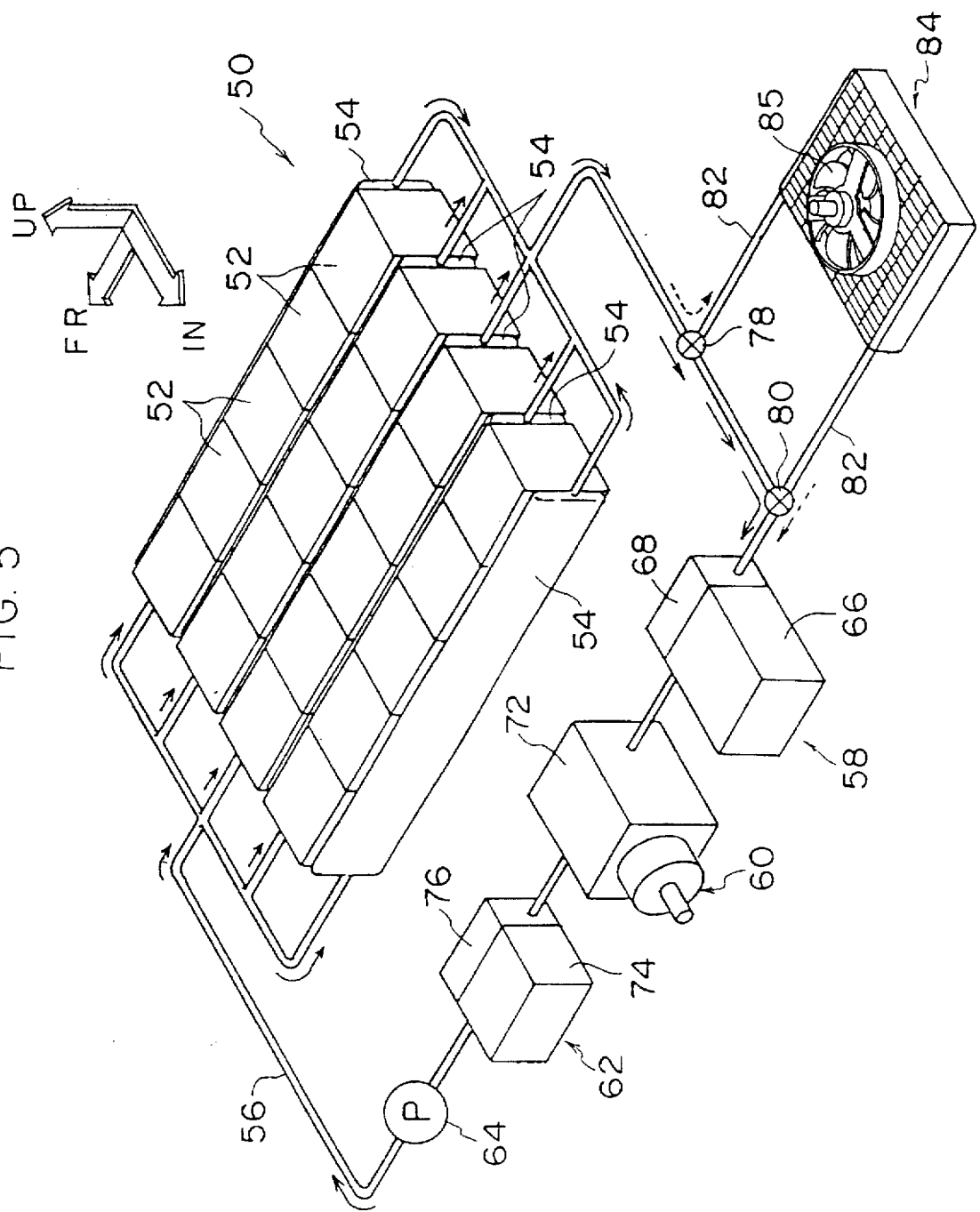
FIG. 5 is a schematic configuration view, depicting a battery heating device in accordance with another embodiment.

FIG. 5 illustrates this embodiment in which a plurality of batteries 52 are arranged in a prescribed position within an unillustrated battery tray. More specifically, adjacent batteries 52 are arranged closely a longitudinal direction of a vehicle, while being spaced apart from one another at a given distance in a transverse direction of the vehicle. In each of such clearances, a tube 54 is accommodated in close proximitity to or in contact with the batteries 52 in such a manner that a length of the tube 54 is positioned parallel to the longitudinal direction of the vehicle. Additional tubes 54 are attached to side surfaces of a bank of the batteries 52 at opposite ends thereof in the transverse direction of the vehicle. The tube 54 is a flat trim-shaped, hollow bag body, which is made of vinyl.

The tubes 54 are connected to a feed pipe 56. That is, the feed pipe 58 is subdivided into as many branches as the number of the tubes 54 at locations adjacent to front and rear end portions of the tubes 54. End portions of the subdivided feed pipes 56 are individually connected to the tubes 54 at the front and rear end portions thereof.

A vehicle charger 58, a traveling motor 60, an inverter 62, and a water pump 64 are aligned in sequence midway along a path of the feed pipe 56.

The vehicle charger 58 (i.e., an AC/DC converter) includes a case 66 and a heat sink (i.e., a radiating plate) 68 that is disposed adjacent to the case 66. The case 66 accommodates a plurality of transistors 70 and the like which are mounted to the beat sink 68. (See FIG. 6.) The heat sink 68 is formed from aluminum or the like. When connected to an unillustrated external power supply, the charger 58 charges the electrically coupled batteries 52 after the transistor 70 convert an alternating current to a direct current.

The traveling motor 60 is accommodated in a housing 72 which is formed from a material having increased heat-transfer efficiency. The motor 60 is an alternating-current motor.

Similar to the vehicle charger 58, the inverter 62 includes a case 74 and a heat sink 76. The case 74 houses a plurality of transistors (not shown) which are mounted to the heat sink 76. The inverter 62 converts the direct current, which is supplied from the electrically coupled batteries 52, to alternating current in order to rotate the electrically coupled traveling motor 60.

Water in the feed pipe 56 acts as a heat-transfer medium, and the water pump 64 is operated to feed the water in a direction of the arrows located along the feed pipes 56 in FIG. 5.

In addition, water valves 78 and 80 are provided midway along the path of the feed pipe 56 at a location where the above-described batteries 52 and vehicle charger 58 are connected together. A branch pipe 82 is connected to the water valves 78 and 80, with a radiator 84 being positioned midway along the branch pipe 82. Accordingly, when the water valves 78 and 80 are fully opened, the water in the tubes 54 is fed in a direction of solid line arrows of FIG. 5 without passing through the radiator 84. However, when the water valves 78 and 80 are completely closed, the water is fed through the radiator 84 along a direction of dashed line arrows of FIG. 5 after leaving the tubes 54. The radiator 84 rotates an air-cooling fan 85 so as to air cool the water (i.e., hot water) which flows in a core of the radiator 84.

Figure 6:
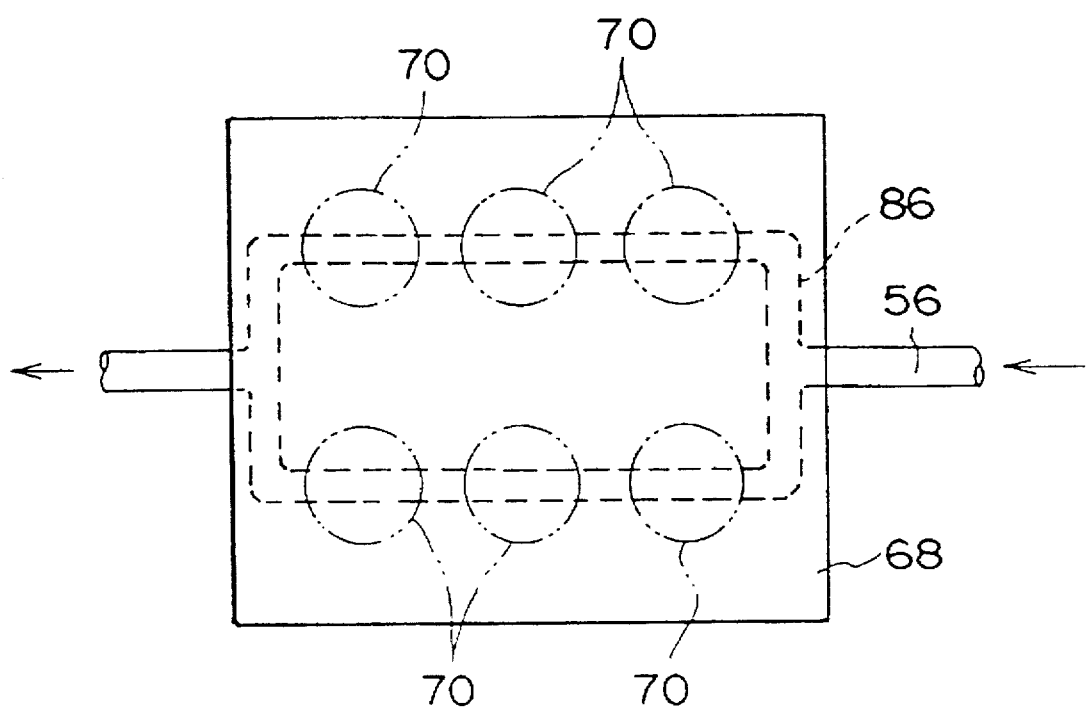
FIG. 6 is n schematic view, showing an arrangement of a heat sink, a heat-transfer pipe, and a transistor, all of which constitute a vehicle charger shown in FIG. 5.
Figure 7:
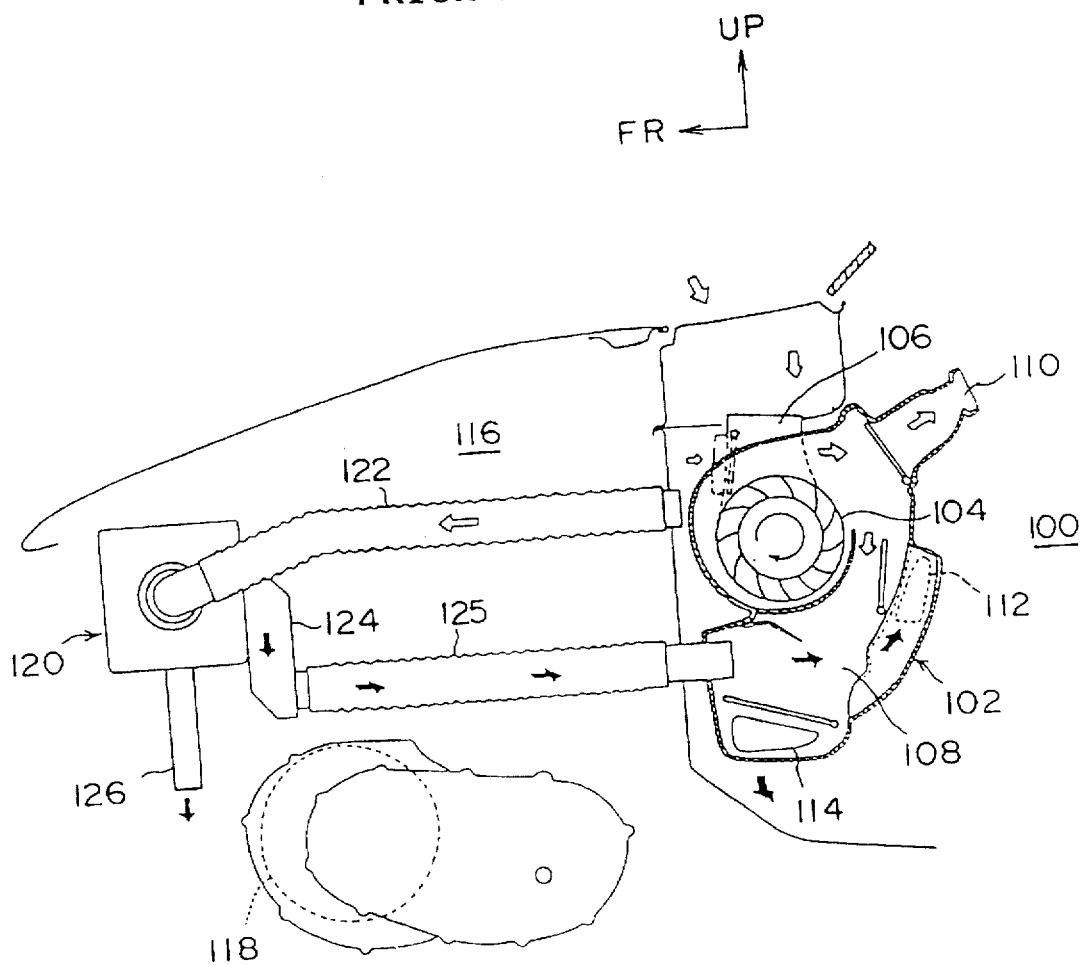
FIG. 7 is a schematic configuration view, showing an example of the related art in order to outline an air conditioner for an electric vehicle having a combustion heater.
Figure 8:
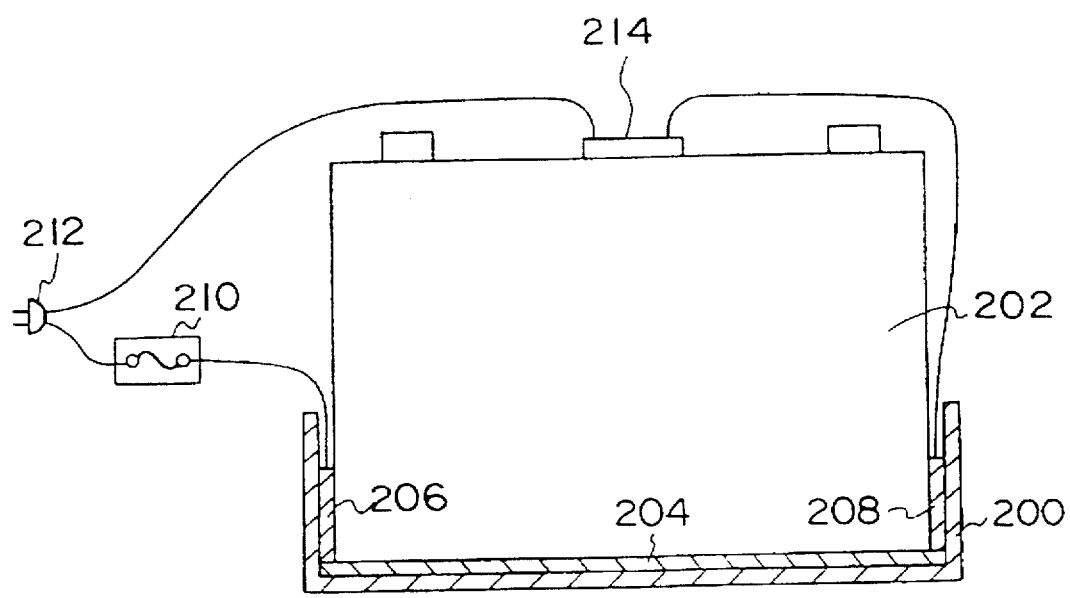
FIG. 8 is a schematic configuration view, showing a battery heating device according to another example of the related art.

Referring now to FIG. 6, the previously mentioned vehicle charger 58 is shown having a heat-transfer pipe 86 embedded in the heat sink 68. The heat-transfer pipe 86 takes the form of a substantially rectangular-shaped loop, and is connected to the feed pipe 56 at both end portions of the heat-transfer pipe 86. The previously mentioned plurality of transistors 70 are aligned on a pathway of heat-transfer pipe 86 so as to be spaced apart from one another at predetermined intervals. The heat-transfer pipe 86 is formed from a material which has good heat-transfer efficiency. The same heat-transfer pipes 86 are also embedded in the heat sink 76 of the inverter 62 as well as the housing 72 of the traveling motor 60.

The above-described feed pipe 56 has an unillustrated temperature-detecting sensor disposed adjacent to outlets of the tubes 54. The temperature-detecting sensor is connected to an unillustrated control device so as to send out signals thereto which represent detected values. The control device in turn is connected to the water valves 78 and 80 so as to effect control over opening and closing of the valves 78 and 80. More specifically, the control device initially evaluates and compares differences between a previously stored optimal temperature of the batteries 52 (i.e., a predetermined temperature) and a detected temperature. Then, the control device opens the water valves 78 and 80 when the detected temperature is less than the predetermined temperature. Conversely, the control device closes the water valves 78 and 80 when the detected temperature is higher than the predetermined temperature.

Added to this, in the above-described structure, the tubes 54 and the feed pipe 56 correspond to a conduit formed body. The transistors 70 of the vehicle charger 58 represent a charging means, while the transistors (not shown) of the inverter 62 correspond to an electric power-converting means. The heat sink 68 and the heat-transfer pipe 86 of the vehicle charger 58 collectively represent a transfer means and a first transfer means. The heat sink 76 of the inverter 62, the housing 72 of the traveling motor 60, and the respective heat-transfer pipes (not shown), which are embedded in the heat sink 76 and the housing 72, collectively correspond to a transfer means and a second transfer means. Further, the water valves 78 and 80, the unillustrated temperature-detecting sensor, and the unillustrated control device collectively correspond to a temperature control means.

Next, the operation of the present embodiment will be described hereinafter in accordance with respective processes of charging and traveling.

For charging batteries 52, a vehicle charger 58 is connected to an unillustrated external power supply.

Upon the connection of the vehicle charger 58 to the power supply, a control device full opens water valves 78 and 80 (to feed water in the direction of solid line arrows in FIG. 5). In this state, an unillustrated switch of a water pump 64 is turned on in order to actuate the water pump 64. The water is thereby fed in the above-identified arrow direction. Accordingly, after being drawn from the water pump 64, the water is fed through tubes 54 the batteries 52 in the following in sequence: a heat-transfer pipe 86 in a heat sink 68 of the vehicle charger 58; a heat-transfer pipe (not shown) in a housing 72 of a traveling motor 60; and, a heat-transfer pipe (not shown) in a heat sink 76 of an inverter 62. At this time, the temperature of the water after having passed through the tubes 54 is continuously outputted to the control device by a temperature-detecting sensor.

Meanwhile, an alternating current is supplied from the external power supply when the vehicle charger 58 is connected to the power supply. The alternating current is then converted into a direct current by transistors 70 in the vehicle charger 58. The batteries 52 are thereby charged. In this instance, an operating loss of the transistors 70, caused by the switching and the like thereof, results in heat energy (i.e., exhaust heat) which is transferred to the inside of the heat sink 68 through its surface. The transferred exhaust heat is further transferred to the heat-transfer pipe 86 which remains embedded in the heat sink 68. During charging in low temperature environments, exhaust heat from the vehicle charger 58, which represents some 30% of charging power, is transferred to the water through the heat-transfer pipe 86. As a result, the temperature of the heat-transfer pipe 86 rises, thereby heating to the water flowing therein. That is, while flowing through the heat-transfer pipe 86 in the heat sink 68, the water is heated by the exhaust heat from the transistors 70 in the vehcle charger 58. The heated water after having advanced through the interior of the housing 72 of the traveling motor 60, is thereafter fed through the inside of the tubes 54 via the heat sink 76 of the inverter 62 and the water pump 64. Accordingly, the heated water heats the batteries 52 in the process of passing through the inside of the tubes 54. As a result, the batteries 52 exhibit a good charging function even in low temperature environments. Since the motor 60 is at rest during the above-described charging process, neither the traveling motor 60 nor the inverter 62 generate heat.

During traveling, the inverter 62 converts electric power, which is stored in the batteries 52, from direct current to alternating current. The traveling motor 60 is thereby rotated. As a result, during traveling, heat is generated by both the motor 60 and the transistors (not shown) of the inverter 62, and not by the vehicle charger 58.

In this state, when the unillustrated switch of the water pump 64 is turned on to actuate the water pump 64, water is circulated in a manner similar to the above-described time of charging. Accordingly, the water is heated by exhaust heat from the motor 60 and the above-identified transistors while being fed through: the heat-transfer pipe in the housing 72 of the motor 60; and, the heat-transfer pipe in the heat sink 76 of the inverter 62. During traveling in low temperature environments, the corresponding exhaust heat from the motor 60 and the inverter 62, which represents somewhere between 20 and 30% of electric power discharge power, is transferred to the water through the heat-transfer pipes. The heated water heats the batteries 52 while passing through the tubes 54. As a result, the batteries 52 exhibit a good discharge function even in low temperature environments.

When traveling in high temperature environments such as in summer, there are cases in which the temperature of the batteries 52 exceed a desirable temperature. However, since the temperature of the batteries 52 are detected and outputted to the control device by the temperature-detecting sensor, the control device appropriately alters the amount of each opening of the water valves 78 and 80 when the batteries 50 are at a temperature above a preferable level. For example, in the case of an the temperature of the batteries 52 being too high, the control device fully close the water valves 78 and 80 (a state in which the water is fed in the direction of the dashed line arrows in FIG. 5). As a consequence, hot water after leaving the tubes 54 is pumped into a radiator 84 through a branch pipe 82. The hot water is air-cooled by the cooling fan 85 of the radiator 84, thereby absorbing the heat from the hot water. The water is cooled as a result of the above heat absorption, and is then redirected to the feed pipe 56 and then passed through the traveling motor 60, the inverter 62, and, the water pump 64. Thereafter, the cooled water is fed to the tubes 54, by which the batteries 52 are cooled. (in this process, the traveling motor 60 and the inverter 62 are cooled down as well.) As a result, the batteries 50 are stably maintained at a predetermined temperature. When the batteries 52 are at a slightly high temperature, the water valves 78 and 80 are opened about halfway.

As can be seen from the above, in the present embodiment, the batteries 52, the vehicle charger 58, the traveling motor 60, and the inverter 62 are connected together via the feed pipe 56 in such a manner as to raise the temperature of the batteries 52 through water that is heated by: the exhaust heat from the vehicle charger 58 during charging; and, the exhaust heat from the motor 60 and the inverter 62 during traveling. This construction allows the charging-discharging function of the batteries 52 to be exercised successfully during both charging and traveling in low temperature environments. Furthermore, when charging or traveling, basically, only the operation of the waterpump consumes electric power. Therefore, considerable savings of electric power can be made with respect to an external power source during charging and with respect to the batteries 52 during traveling. Especially, the above benefit of reduced consumption of electric power required for the batteries 52 during traveling contributes to an increase in mileage per charge. Moreover, the above use of exhaust heat for raising the temperature of the batteries 52 eliminates the need for any additional construction (for example, a planar-shaped heater and the like) to be provided for raising the temperature of the batteries 52. Therefore, a large-sized device is avoided.

Further, in the present embodiment, the branch pipe 82 is located midway along the feed pipe 56, with the radiator 84 being positioned midway along the branch pipe 82. Accordingly, in case of an excessive rise in the temperatures of the batteries 52 in summer or under other circumstances, hot water in the tubes 54 can be cooled by the radiator 84. As a result, the batteries 52 can be maintained at a desired preset temperature.

Moreover, in the present embodiment, the inverter 62, the traveling motor 60, the vehicle charger 58, and the batteries 52 (which have a large heat capacity) are thermally coupled together. This arrangement increases the entire heat capacity, while decreasing thermal variation that accompanies heat generation from each of the above units. As a result, a small-sized unit is usable as the radiator 84.

Although the present invention employs an alternating-current motor as the traveling motor 60, the same is not limited thereto. Alternatively, a direct-current motor may be used. In this case, the inverter 62 must be replaced by a DC/DC converter, but the converter functions as a heat-generating body in a manner similar to the inverter 62.

In addition, although the present embodiment is designed to utilize both the exhaust heat from the traveling motor 60 and that from the inverter 62 during traveling, the same is not limited thereto. Alternatively, only one of the above exhaust heat sources may be used.

As previously described, a battery heating device for an electric vehicle in accordance with a first aspect of the present invention is designed for use in an electric vehicle which is provided with batteries serving as a driving source and a combustion heater for heating. The battery heating device has the batteries disposed around the combustion heater so as to provide a transfer means for transferring exhaust heat from the operating combustion heater to the batteries. This feature offers an excellent benefit in which a battery temperature can be elevated and maintained so as to reduce consumption of electric power during traveling. Another outstanding benefit is that the exhaust heat from the combustion heater can be effectively used to avoid degradation of the performance of the batteries.

A battery heating device for an electric vehicle in accordance with a second aspect is designed for use in an electric vehicle which is provided with batteries acting as a driving source and a charging means for charging the batteries by being connected to an external power supply. The battery heating device comprises: a conduit formed body, which has a circulating path defined in such a manner as to arrange the batteries midway along the circulating path; and, a transfer means, which is located midway along the circulating path in order to transfer exhaust heat from the charging means during charging to a heat-transfer medium which flows within the conduit formed body. This feature has an excellent benefit in which a battery temperature can be elevated and maintained so as to require reduced consumption of electric power during charging.

A battery heating device for an electric vehicle in accordance with a third aspect is adapted for use in an electric vehicle which includes: batteries acting as a driving source; a traveling motor subjected to rotation in response to electric supplied from the batteries; and, an electric power-converting means electrically connected between the traveling motor and the batteries. The battery heating device comprises: a conduit formed body, which has a circulating path defined in such a manner as to arrange the batteries midway along the circulating path; and, a transfer means, which is located midway along the circulating path so as to allow exhaust heat from at least one of the traveling motor and the electric power-converting means during traveling to be transferred to a heat-transfer medium which flows in the conduit formed body. This feature provides a better benefit in which a battery temperature can be elevated and maintained so as to reduce consumption of electric power during traveling.

Further, a battery heating device for an electric vehicle in accordance with a fourth aspect is suited for use in an electric vehicle which includes: batteries acting as a driving source; a charging means for charging the batteries by being connected to an external power supply; a traveling motor subjected to revolution in response to electric supply from the batteries; and, an electric power-converting means electrically connected between the traveling motor and the batteries. The battery heating device comprises: a conduit formed body, which has a circulating path defined in such a manner as to arrange the batteries midway along the circulating path; a first transfer means, which is located midway along the circulating path so as to transfer exhaust heat from the charging means during charging to a heat-transfer medium which flows in the conduit formed body; and, a second transfer means, which is located midway along the circulating path so as to permit exhaust heat from at least one of the traveling motor and the electric power-converting means during traveling to be transferred to the heat-transfer medium. This feature provides a superb benefit in which a battery temperature can be elevated and maintained so as to reduced consumption of electric power during both charging and traveling.

Moreover, a battery heating device for an electric vehicle in accordance with a fifth aspect is based on any one of the second aspect through the fourth aspect of the present invention, and further comprises: a branch path-forming body, which is located midway along the circulating path so as to form a branch path; a cooling means, which is positioned midway along the branch path in order to cool a heat-transfer medium which flows within the branch path-forming body; and, a temperature control means, which regulates an amount of the heat-transfer medium to be fed to the cooling means so as to maintain the batteries at a predetermined temperature. This feature provides superb benefits in which a battery temperature can be elevated and maintained so as to reduce consumption of electric power, and further the batteries can be maintained at the predetermined temperature.

In addition, a battery heating device for an electric vehicle in accordance with a sixth aspect is based on the first aspect of the present invention, and further comprises: a conduit formed body, which has a cooling purpose-circulating path defined in such a manner as to locate the transfer means midway along the cooling purpose-circulating path; a cooling means, which is positioned midway along the cooling purpose-circulating path in order to cool a heat-transfer medium which flows in the conduit formed body; and, a temperature control means, which regulates an amount of the heat-transfer medium to be fed to the cooling means so as to maintain the batteries at a predetermined temperature. This feature offers superb benefits in which a battery temperature can be elevated and maintained so as to reduce consumption of electric power during traveling, and further the batteries can be maintained at the predetermined temperature.

What is claimed is:

1. A battery heating device for an electric vehicle, comprising:

batteries serving as a driving source of the electric vehicle;

electric power-converting means electrically connected to said batteries;

a traveling motor electrically connected to said electric power-converting means and rotated to run the electric vehicle in response to an electric power supply from said batteries through said electric power-converting means;

a conduit formed body forming a circulating path, said conduit formed body being located in one of close proximity to and in contact with said batteries midway along said circulating path; and, transfer means, positioned midway along said circulating path of said conduit formed body, for transferring exhaust heat from at least one of said traveling motor and said electric power-converting means during traveling to a heat-transfer medium which flows within said conduit formed body.

2. A battery heating device for an electric vehicle according to claim 1, further comprising:

a branch path-forming body located midway along said circulating path of said conduit formed body, said branch path-forming body forming a branch path that is subdivided from said circulating path;

cooling means, positioned midway along said branch path of said branch path-forming body, for cooling said heat-transfer medium which flows within said branch path-forming body; and temperature control means for controlling a temperature of said heat-transfer medium by regulating an amount of said heat-transfer medium to be fed to said cooling means, so as to maintain said batteries at a predetermined temperature.

3. A battery heating device for an electric vehicle according to claim 1, wherein a part of said conduit formed body is embedded in said transfer means.

4. A battery heating device for an electric vehicle according to claim 2, wherein said temperature control means comprises temperature-detecting means for detecting said temperature of said heat-transfer medium which flows within said conduit formed body.

5. A battery heating device for an electric vehicle according to claim 2, wherein said temperature control means comprises a member for changing an amount of said heat-transfer medium to be fed, said member being provided at a connecting portion where said conduit formed body and said branch path-forming body are connected together, and said member changing said amount of said heat-transfer medium to be fed to said branch path-forming body.

6. A battery heating device for an electric vehicle, comprising:

batteries serving as a driving source of the electric vehicle;

charging means for charging said batteries by being connected to an external power supply;

an electric power-converting means electrically connected to said batteries;

a traveling motor electrically connected to said electric power-converting means and rotated to run the electric vehicle in response to an electric power supply from said batteries through said electric power-converting means;

a conduit formed body forming a circulating path, said conduit formed body being located in one of close proximity to and in contact with said batteries midway along said circulating path;

a first transfer means, positioned midway along said circulating path of said conduit formed body, for transferring exhaust heat from said charging means during charging to a heat-transfer medium which flows within said conduit formed body; and a second transfer means, positioned midway along said circulating path of said conduit formed body, transferring exhaust heat from at least one of said traveling motor and said electric power-converting means during traveling to said heat-transfer medium which flows within said conduit formed body.

7. A battery heating device for an electric vehicle according to claim 6, further comprising:

a branch path-forming body located midway along said circulating path of said conduit formed body, said branch path-forming body forming a branch path that is subdivided from said circulating path;

cooling means, positioned midway along said branch path of said branch path-forming body, for cooling said heat-transfer medium which flows within said branch path-forming body; and, temperature control means for controlling a temperature of said heat-transfer medium by regulating an amount of said heat-transfer medium to be fed to said cooling means, so as to maintain said batteries at a predetermined temperature.

8. A battery heating device for an electric vehicle according to claim 6, wherein a part of said conduit formed body is embedded in said first transfer means and said second transfer means.

9. A battery heating device for an electric vehicle according to claim 7, wherein said temperature control means comprises a temperature-detecting means for detecting said temperature of said heat-transfer medium which flows within said conduit formed body.

10. A battery heating device for an electric vehicle according to claim 7, wherein said temperature control means comprises a member for changing an amount of said heat-transfer medium to be fed, said member being provided at a connecting portion where said conduit formed body and said branch path-forming body are connected together, and said member changing said amount of said heat-transfer medium to be fed to said branch path-forming body.

11. A battery heating device for mounting to an electric vehicle to heat batteries that serve as a driving source of the electric vehicle while the batteries being heated are mounted to the vehicle, said device comprising:

a battery charger mounted to said vehicle and connected to said batteries and operative to charge said batteries when activated by a power source external to the batteries;

electrical power converting means electrically connected to said batteries;

a traveling motor electrically connected to said power converting means and rotated to run the electric vehicle in response to an electric power supply from said batteries through said electric power converting means;

a conduit formed body forming a circulating path, said conduit formed body being located in one of close proximity to and in contact with said batteries midway along said circulating path; and transfer means, positioned midway along said circulating path of said conduit formed body, for transferring waste heat from at least one of said battery charger, said traveling motor and said electric power converting means during operation of the corresponding at least one thereof to a heat transfer medium which flows within said conduit formed body.

\* \* \* \* \*